(12) United States Patent
Stauss et al.

(10) Patent No.: US 11,646,589 B2
(45) Date of Patent: May 9, 2023

(54) SWITCHING ARCHITECTURE OF BATTERY CELL PACKS

(71) Applicant: FORD GLOBAL TECHNOLOGIES, LLC, Dearborn, MI (US)

(72) Inventors: Philip Stauss, Pulheim (DE); Johann Kirchhoffer, Cologne (DE); Sebastian Schneider, St. Augustin (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 17/373,139

(22) Filed: Jul. 12, 2021

(65) Prior Publication Data

US 2022/0014030 A1 Jan. 13, 2022

(30) Foreign Application Priority Data

Jul. 13, 2020 (DE) .......................... 102020208703.2

(51) Int. Cl.
  *H02J 7/00* (2006.01)
  *H01M 10/42* (2006.01)
  *H01M 10/44* (2006.01)

(52) U.S. Cl.
  CPC ......... *H02J 7/0024* (2013.01); *H01M 10/425* (2013.01); *H01M 10/441* (2013.01)

(58) Field of Classification Search
  CPC .. H02J 7/0024; H02J 1/00; H02J 9/061; H02J 2310/48; H01M 10/425; H01M 10/441;
  (Continued)

(56) References Cited

U.S. PATENT DOCUMENTS

| 1,238,573 | A | | 8/1917 | Rutherford |
| 5,932,932 | A | * | 8/1999 | Agatsuma ............. H02J 7/0018 307/10.6 |

(Continued)

FOREIGN PATENT DOCUMENTS

| CN | 111989814 A | * | 11/2020 | .......... H01M 10/425 |
| DE | 102011077708 A1 | | 12/2012 | |
| DE | 102011121940 A1 | | 6/2013 | |

OTHER PUBLICATIONS

H. Kim and K. G. Shin, "On Dynamic Reconfiguration of a Large-Scale Battery System," 2009 15th IEEE Real-Time and Embedded Technology and Applications Symposium, 2009, pp. 87-96, doi: 10.1109/RTAS.2009.13. (Year: 2009).*

(Continued)

*Primary Examiner* — M Baye Diao
(74) *Attorney, Agent, or Firm* — Brooks Kushman PC; David Kelley

(57) ABSTRACT

A battery system includes a plurality of battery cell packs arranged in layers selectively connected in series and parallel by a control system controlling a plurality of switches. Each of the battery cell packs includes a plurality of battery cells. A plurality of first switches and a plurality of second switches are controlled by a control system to connect the battery cell packs in response to a desired current output of the battery system and/or a desired voltage output of the battery system irrespective of individual battery cell or battery cell pack voltages or currents associated with state of charge or operational performance. The control system controls the switches to selectively connect the battery cell pack(s) to the output connections in parallel and/or series to provide redundancy and reduce output voltage/current fluctuation otherwise associated with state of charge or underperforming battery cells/packs.

19 Claims, 8 Drawing Sheets

(58) Field of Classification Search
CPC ............. H01M 10/482; H01M 50/269; H01M 50/298; H01M 50/51; H01M 2220/20; Y02E 60/10; Y02T 10/70; B60L 50/64; B60L 58/19; B60L 58/21
USPC ........................................................ 320/117
See application file for complete search history.

(56) References Cited

U.S. PATENT DOCUMENTS

| | | | | |
|---|---|---|---|---|
| 7,893,561 B2* | 2/2011 | Weidenheimer | ...... | H02J 7/0024 307/71 |
| 8,400,012 B2* | 3/2013 | Weidenheimer | .......... | F41B 6/00 307/9.1 |
| 9,018,905 B2 | 4/2015 | Lim et al. | | |
| 9,054,533 B2 | 6/2015 | Gaul et al. | | |
| 9,263,887 B2* | 2/2016 | Tiefenbach | ........... | H02J 7/0016 |
| 9,306,194 B2 | 4/2016 | Kim et al. | | |
| 9,564,663 B2 | 2/2017 | Kim et al. | | |
| 9,641,004 B2 | 5/2017 | Floros et al. | | |
| 10,236,538 B2* | 3/2019 | Chen | ................... | H01M 10/441 |
| 10,498,148 B2* | 12/2019 | Mergener | .................. | B25F 5/00 |
| 10,994,632 B2* | 5/2021 | Kahnt | ................ | H01M 10/425 |
| 2017/0170671 A1* | 6/2017 | Mergener | ............ | H01M 50/247 |
| 2019/0214833 A1* | 7/2019 | Li | ....................... | H01M 10/441 |
| 2019/0280495 A1* | 9/2019 | Mergener | ............ | H01M 50/247 |
| 2021/0135463 A1* | 5/2021 | Mergener | ............ | H01M 50/247 |
| 2021/0151726 A1* | 5/2021 | Hinterberger | ........... | B60L 50/64 |
| 2021/0265710 A1* | 8/2021 | Muenzel | ............... | H02J 7/0016 |

OTHER PUBLICATIONS

Y. Zhu, W. Zhang, J. Cheng and Y. Li, "A novel design of reconfigurable multicell for large-scale battery packs," 2018 International Conference on Power System Technology (POWERCON), 2018, pp. 1445-1452, doi: 10.1109/POWERCON.2018.8602284. (Year: 2018).*

Examination Report DE 10 2020 208 703.2 Filed Mar. 13, 2021, 7 pages.

* cited by examiner

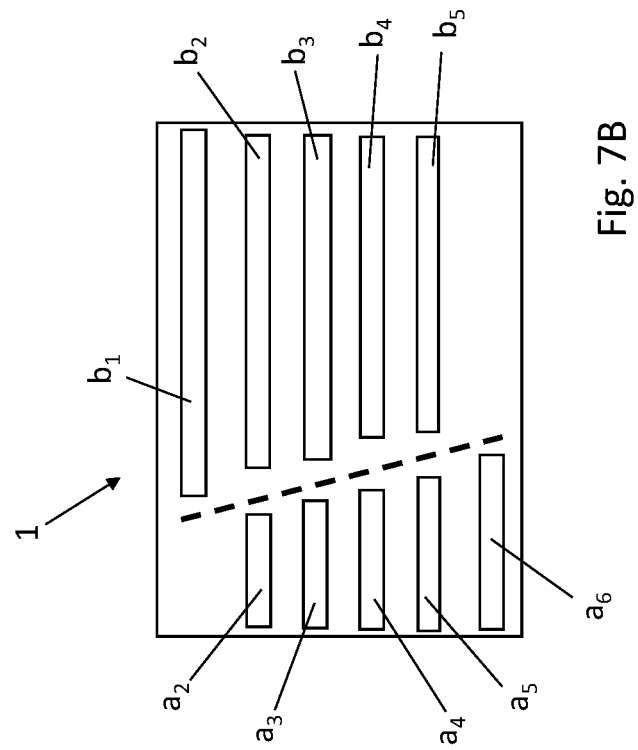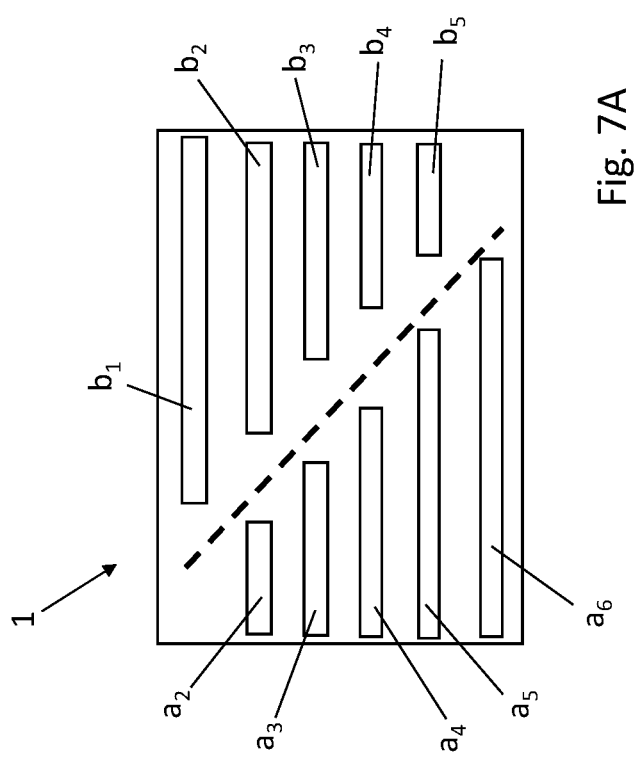

SWITCHING ARCHITECTURE OF BATTERY CELL PACKS

CROSS-REFERENCE TO RELATED APPLICATIONS

This application claims foreign priority benefits under 35 U.S.C. § 119(a)-(d) to DE Application 10 2020 208 703.2 filed Jul. 13, 2020, which is hereby incorporated by reference in its entirety.

TECHNICAL FIELD

This disclosure relates to a battery system made up of battery cell packs arranged in layers and controlled to be connected in series or parallel to provide a desired maximum voltage or current, respectively.

BACKGROUND

Batteries used for hybrid and electric vehicles consist of many battery cells arranged and connected in series and in parallel to achieve the required voltage and capacitance. This principle is used irrespective of the battery chemistry (lithium-ion, lead acid or nickel metal hydride). This arrangement addresses limitations of currently available battery technology (depending on the chemistry which is used) with respect to battery cell voltage (for example 3.6 V in the case of $LiCoO2$ or 3.3 V in the case of $LiFePO4$). The voltage supplied by a single cell, without a serial circuit of a plurality of cells, is far too small to be used in high voltage applications. Furthermore, the voltage may depend on the battery cell state of charge (SOC). Moreover, redundancy in voltage sources is a requirement imposed for batteries used in hybrid and electric vehicles, in particular for "drive by wire" systems.

A battery system and a method for providing an intermediate voltage in traction batteries for electric vehicles is known from DE 10 2011 077 708 A1. The battery system has a battery module which comprises a first high-voltage connection, a second high-voltage connection and a multiplicity of battery cell modules connected in series between the first and second high-voltage connection. The battery system additionally has a switching matrix, which comprises a multiplicity of switch rails which are each connected to one of the nodal points between respective pairs of the battery cell modules connected in series, a multiplicity of first switching devices, which are designed to connect in each case one of the shift rails to a first low-voltage connection of the switching matrix, and a multiplicity of second switching devices which are designed to connect in each case one of the shift rails to a second low-voltage connection of the switching matrix. In this case, depending on the switching state of the first and second switching devices, a first sum voltage of all battery modules connected in series is applied between the first and the second high-voltage connection, and a second sum voltage of some of the battery cell modules connected in series is applied between the first and the second low-voltage connection.

SUMMARY

One or more embodiments according to this disclosure provide a structurally simple battery system that minimizes voltage fluctuations irrespective of the state of charge of the battery while providing independently switchable redundancies in voltage sources to ensure functionality, for example in the event of an interruption in the energy supply of various vehicle electrical systems such as "drive by wire" systems.

In various embodiments, a battery system includes a plurality of battery cell packs, a plurality of first switches, a plurality of second switches and a control system, wherein the battery cell packs are arranged in "m" layers that may each be connected to output connections of the battery system and can be connected in parallel to set a maximum possible current output of the battery system, and can be connected in series in order to set a voltage level of the battery system. The control system is designed and set up to specify a respective closing or opening of a first and/or second switch to selectively connect a battery cell pack to the output connections and/or to connect in parallel and/or in series to at least one further battery cell pack by combining an outer layer of the battery cell packs (n=0, n=m) in a first group or a second group. The battery cell packs of an inner layer (n=1 to n=m−1) are in each case divided into a first group and a second group, wherein each first group and each second group comprises one or a plurality of battery cell pack(s) and the layer-specific sum of all battery cell packs is the same in all layers "m". The second switch in each case is arranged between the groups of two adjacent layers "n" and "n+1" such that the first group of the layer "n" can be connected in series to the second group of the layer "n+1" with said switch, and the first switch is arranged between the groups of an inner layer "n" in such a way that in each case the first group of the layer "n" can be connected in series to the second group of the layer "n" with said switch. As such, the battery cell packs may be divided into groups that can be connected in series and/or in parallel. The first switch may be controlled to connect the first group to the output connections of the battery system and the respective layer in which the group is arranged can be connected in parallel to other layers of the battery system. In addition, in the case of inner layers, the first group of a layer "n" can be connected in series to the second group of the same layer "n" by means of the first switch.

The second switch may be controlled such that the first group of the layer "n" can be connected to the second group of the layer "n+1" so that these groups can be connected to the output connections of the battery system and can be connected in parallel to other layers of the battery system or other groups connected in series, for example to the first group of the layer "n+1" and the second group of the layer "n+2".

The first and second switches are opened or closed by the control system, wherein each switch is connected to the control system by a signal connection.

It is, of course, also conceivable that a group can be connected individually to the output connections of the battery system and/or can be connected in parallel to other layers of the battery system or groups connected in series.

As used in this description, a battery cell pack comprises in each case a plurality of battery cells combined in one structural unit.

A battery system according to one or more embodiments provides voltage stabilization irrespective of the state of charge of the battery and irrespective of a discharge rate and environmental influences. In other words, it is therefore possible for a low number of battery cell packs to be connected in series in the case of a first higher state of charge, and a higher number of battery cell packs to be connected in series in the case of a lower state of charge in comparison to the first state of charge, to compensate for the deteriorated voltage level of the individual battery cell packs. In this case, as a result of forming groups, the number of switches can be reduced compared to the known prior art. In addition, underperforming battery packs and/or groups can be separated and isolated from battery packs and/or groups performing to design specifications.

The system architecture and control strategy provides for the ratio between the number of battery cell packs in the first group of a layer "n" and the number of battery cell packs in the second group of the same layer "n" to change from layer to layer. In other words, the number of battery cell packs in the first group of the layer "n", in a direction from one outer layer to another outer layer, reduces to the same extent as the number of battery cell packs in the second group of the layer "n" increases. Of course, it is also possible that the number of battery cell packs in the second group of the layer "n", in a direction from one outer layer to the other outer layer, reduces to the same extent as the number of battery cell packs in the first group of the layer "n" increases.

In one embodiment, the number of battery cell packs in the first group of the first outer layer (n=0) is the same as the battery cell packs in the second group of the last outer layer (n=m). In another embodiment, the number of battery cell packs in the second group of the first outer layer (n=0) is the same as the battery cell packs in the first group of the last outer layer (n=m).

In one embodiment, the change of the ratio exhibits a linear course with a constant slope. The ratio between the number of battery cell packs in the first group and the number of battery cell packs in the second group therefore changes in a linear manner from layer to layer. The slope of the linear course is constant, irrespective of the size of the slope in the case of a constant number of layers. In other words, the slope can be large, so that the ratio between the number of battery cell packs in the first group and the number of battery cell packs in the second group in the second layer is 1 to 10 and the ratio between the number of battery cell packs in the first group and the number of battery cell packs in the second group in the penultimate layer is 10 to 1, for example. However, the slope can also be small, so that in the case of the same number of layers, as in the preceding example, the ratio in the second layer is 1 to 2 and the ratio in the penultimate layer is 2 to 1, for example.

In one further embodiment, provision is made for the change of the ratio to have a piecewise linear course with different slopes. The course of the change of the ratio may be divided into two sections, for example. The slope in the second section may be larger in comparison to the slope in the first section, or vice versa.

Provision can advantageously be made for the change of the ratio to have an interrupted linear course.

In a structurally simple way, further output connections are provided to which one of the first groups or one of the second groups can be connected to tap a voltage which is applied to the respective group. This makes it possible to provide switchable redundancies in voltage sources of the corresponding vehicle electrical system voltages for functional operation of various vehicle systems, such as "drive by wire" systems, for example. This also makes it possible to provide different voltage levels (conventionally 5V, 12V, 48V and high voltage) for supplying corresponding functionalities, for example for a sensor or an electric motor, from the same battery system.

Provision is advantageously made for a measuring point to be arranged on both sides of a group, wherein the measuring points are designed and set up to collectively measure a voltage which is actually applied to the respective group and/or the groups which are in each case connected in series to one another and to transmit corresponding measurement signals to the control system.

Further details of representative embodiments of the claimed subject matter are set forth in the subsequent description and associated drawings, in which:

BRIEF DESCRIPTION OF THE DRAWINGS

FIGS. 7A-7D show possible changes of the ratio between the number of battery cell packs in the first group and the number of battery cell packs in the second group.

DETAILED DESCRIPTION

As required, detailed embodiments of the claimed subject matter are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
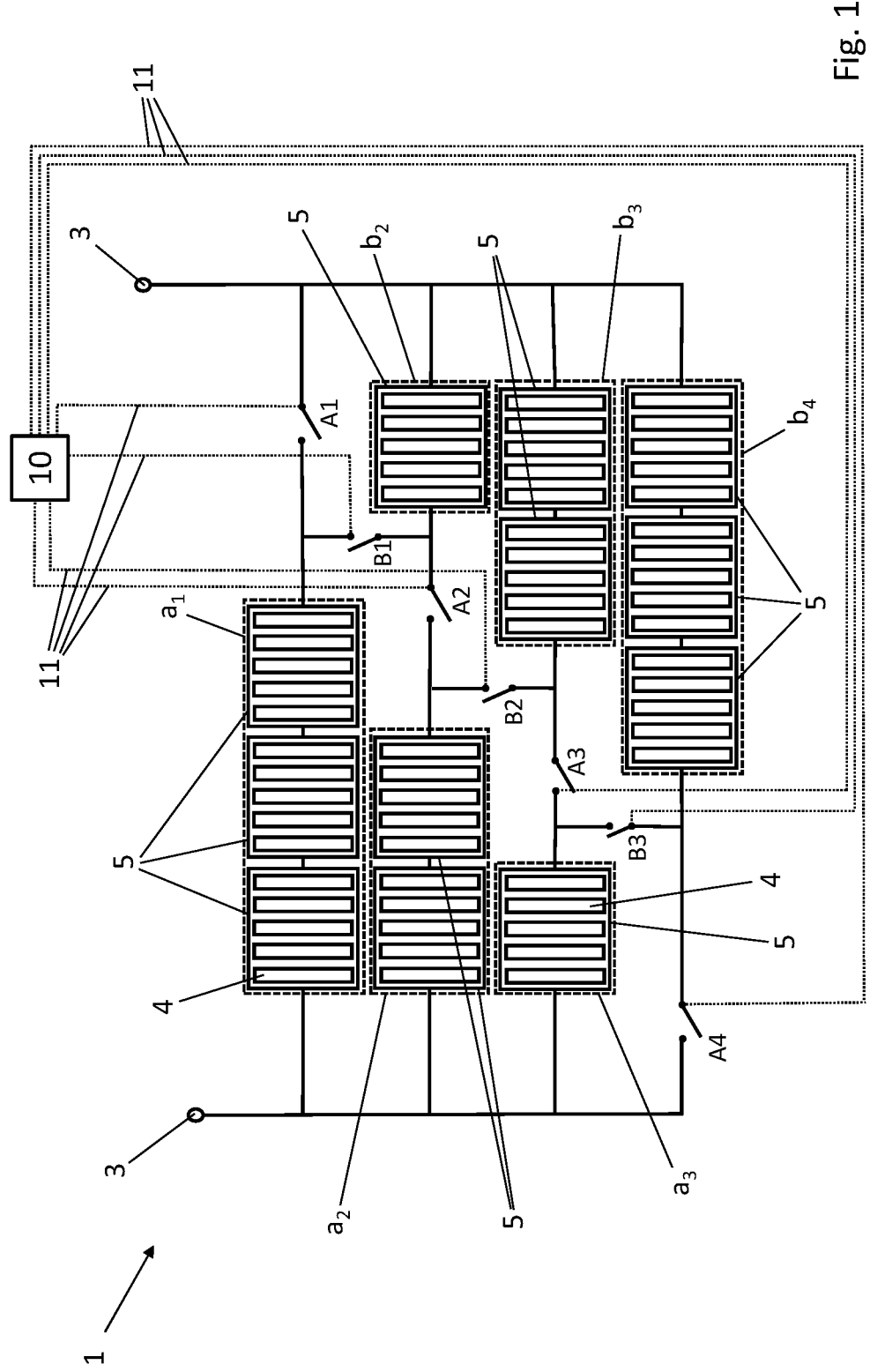
FIG. 1 shows a schematic battery system with four layers and open first and second switches.

FIG. 1 shows a schematic battery system 1 with four layers (m=4), and open first switches A1 ... A4 and second switches B1 ... B3. Although the battery system 1 shown has four layers, battery systems with fewer than four or more than four layers are, of course, also possible.

The battery cell packs 5 each comprise five battery cells 4 and are divided into groups. Groups $a_1$ and $b_4$ therefore comprise fifteen battery cells 4 in each case, groups $a_2$ and $b_3$ ten battery cells 4 in each case and groups $a_3$ and $b_2$ five battery cells 4 in each case. Groups $a_3$ and $b_2$ therefore comprise only one battery cell pack in each case.

Group $a_1$ is arranged in the first and outer layer n=0 of the battery system 1. By means of the switch A1, group $a_1$ can be connected to the output connections 3 of the battery system 1 and the first layer n=0 can be connected in parallel to other layers of the battery system 1. All of this applies accordingly to the switch A4 in relation to group $b_4$, wherein group $b_4$ is arranged in the last and outer layer n=m=4.

The switch A2 is arranged between group $a_2$ and group $b_2$. By means of the switch A2, these two groups can therefore be connected in series, the layer n=2 can be closed and thus groups $a_2$ and $b_2$ can be connected to the output connections 3 of the battery system and can be connected in parallel to other layers of the battery system or other groups connected in series. All of this applies accordingly to the switch A3 in relation to groups $a_3$ and $b_3$.

The switch B1 is arranged between group $a_1$ and group ba. By means of the switch B1, these two groups can therefore be connected in series, groups $a_1$ and $b_2$ can be connected to the output connections 3 of the battery system and can be connected in parallel to other layers of the battery system or other groups connected in series. All of this applies accordingly to the switch B2 in relation to groups $a_3$ and $b_3$ as well as to the switch B3 in relation to groups $a_3$ and $b_4$.

The switches A1 . . . A4, B1 . . . B3 are opened or closed by means of the control system 10, wherein each switch A1 . . . A4, B1 . . . B3 is connected to the control system 10 by means of a signal connection 11.

Figure 2:
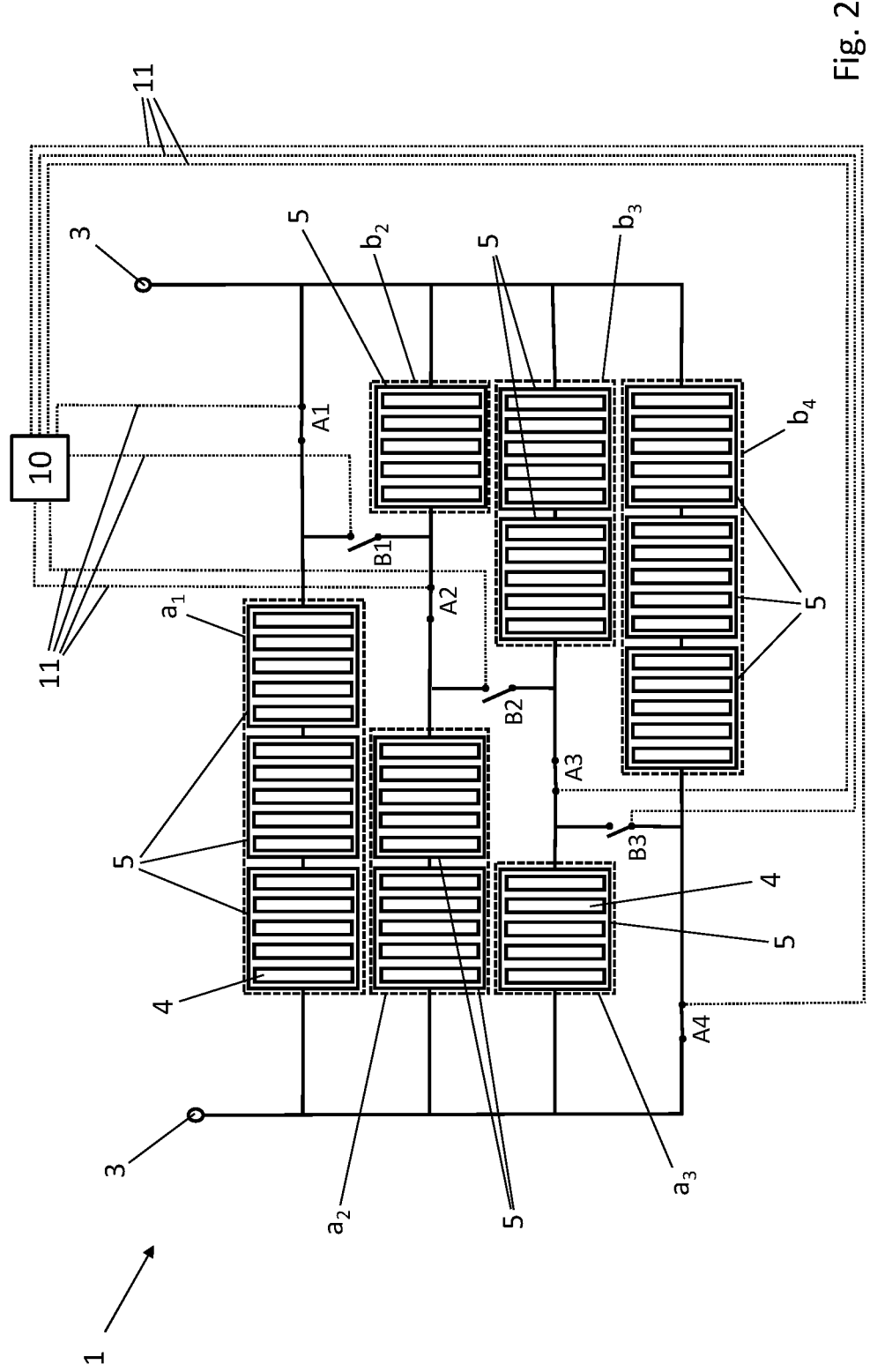
FIG. 2 shows the schematic battery system according to FIG. 1 with closed first switches.

FIG. 2 shows the schematic battery system 1 according to FIG. 1 with closed first switches A1 . . . A4. By closing the first switches A1 . . . A4, the four layers of the battery system 1 are connected in parallel in a "clean layer" and are connected to the output connections 3. A clean layer means that in the two inner layers, the first group $a_n$ of the layer n is connected in series to the second group $b_n$ of the layer n in each case.

Figure 3:
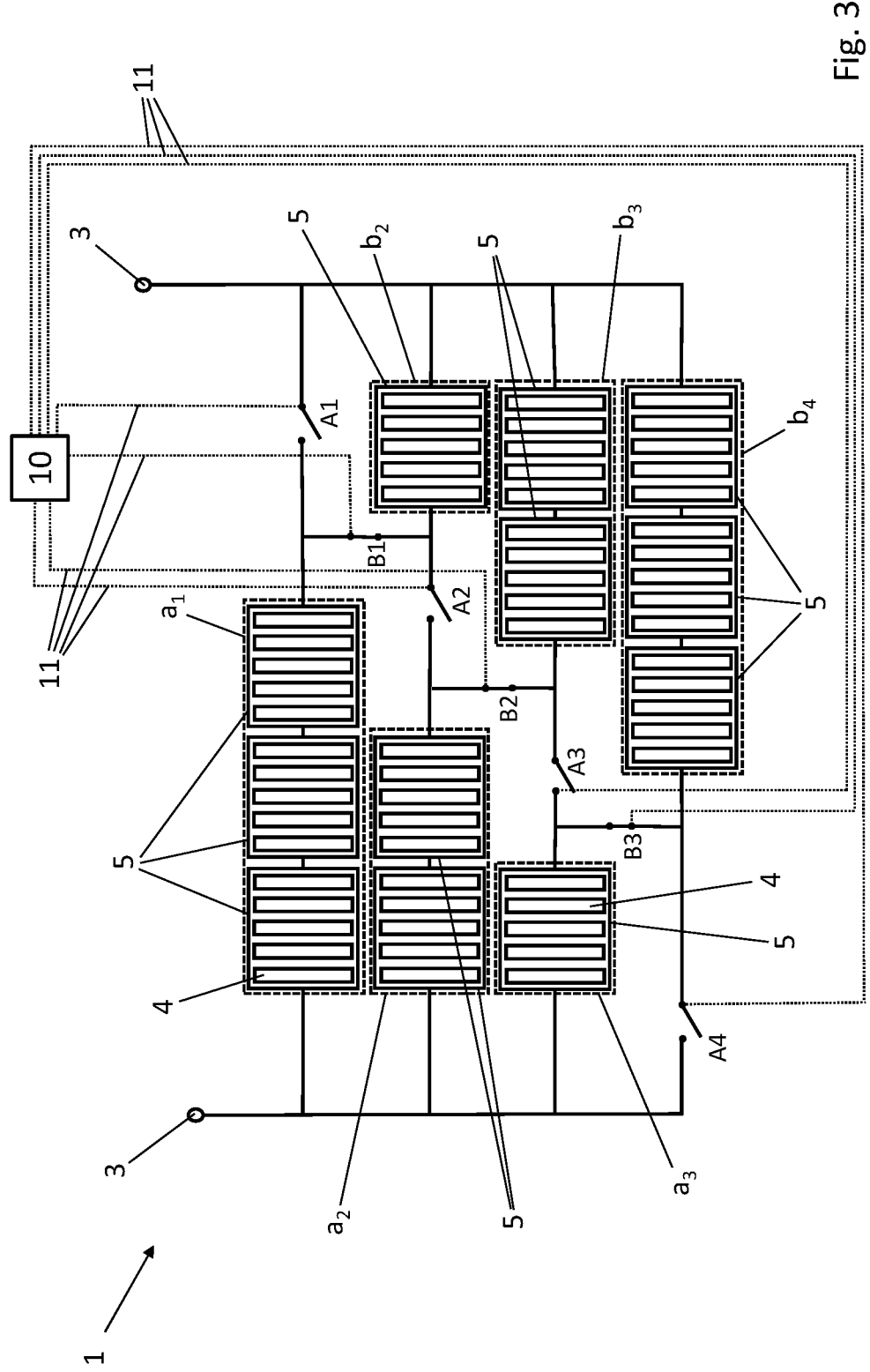
FIG. 3 shows the schematic battery system according to FIG. 1 with closed second switches.

FIG. 3 shows the schematic battery system 1 according to FIG. 1 with closed second switches B1 . . . B3. By closing the second switches B1 . . . B3, the four layers of the battery system 1 are connected in parallel "across layers" and are connected to the output connections 3. Across layers means the first group $a_n$ of the layer n is connected in series to the second group $b_{n+1}$ of the layer n+1 in each case. A higher voltage at the same state of charge of the battery cells or a similar voltage at a lower state of charge of the battery cells can be achieved compared to the circuit shown in FIG. 2 by means of the circuit of the battery system 1 shown in FIG. 3.

Figure 4:
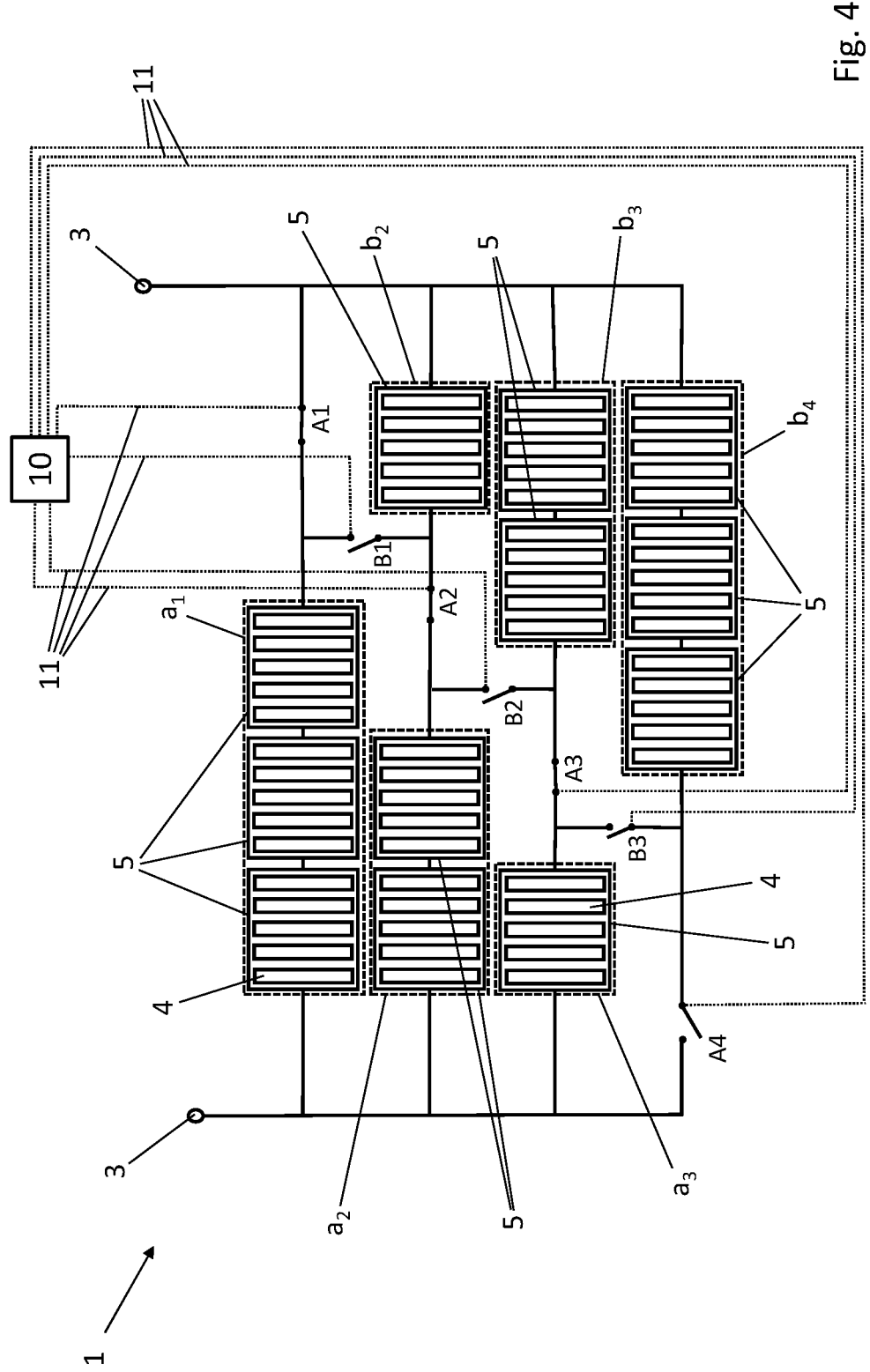
FIG. 4 shows the schematic battery system according to FIG. 1 with a plurality of closed and open switches and an open first switch and an open second switch.

FIG. 4 shows the schematic battery system 1 according to FIG. 1 with a plurality of closed and open switches A1 . . . A3, B1 . . . B2 and an open first switch A4 and an open second switch B3. In the example shown, one or a plurality of battery cells of group $b_4$ is underperforming relative to design specifications or other specified parameters that may be monitored by control system 10. To separate this group $b_4$ from the other groups $a_1$ . . . $a_3$, $b_2$ . . . $b_3$ and the output connections, the switches B3 and A4 are open.

Figure 5:
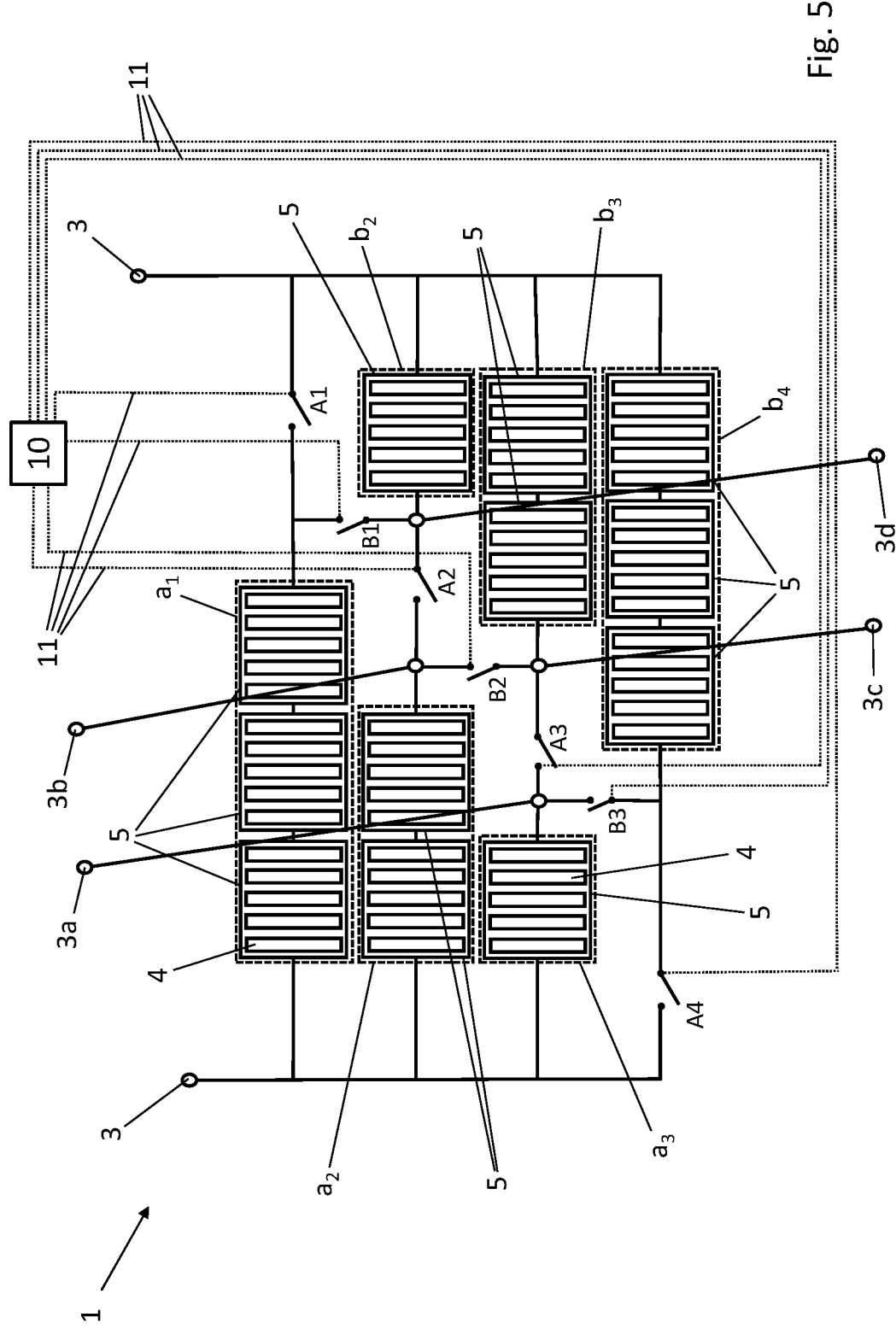
FIG. 5 shows the schematic battery system according to FIG. 1 with further output connections.

FIG. 5 shows the schematic battery system according to FIG. 1 with further output connections ($3a$ . . . $3d$). The further output connection $3b$, together with the output connection 3, taps the voltage at group $a_2$. The further output connection $3d$, together with the output connection 3, taps the voltage at group $b_2$. The further output connection $3a$, together with the output connection 3, taps the voltage at group $a_3$. The further output connection $3c$, together with the output connection 3, taps the voltage at group $b_3$. In this case, $a_2$ and $b_3$ as well as $a_3$ and $b_2$ are in each case redundant groups, such that the voltage from two redundant groups in each case can be provided. The control system 10 can separate an anomalous group $b_2$ (as compared to FIG. 4 for group $b_4$) and replace it with a redundant group $a_3$ by specifying the opening of the switches B1 and A2 and tapping the voltage via the output connections $3a$ and 3, for example.

Figure 6:
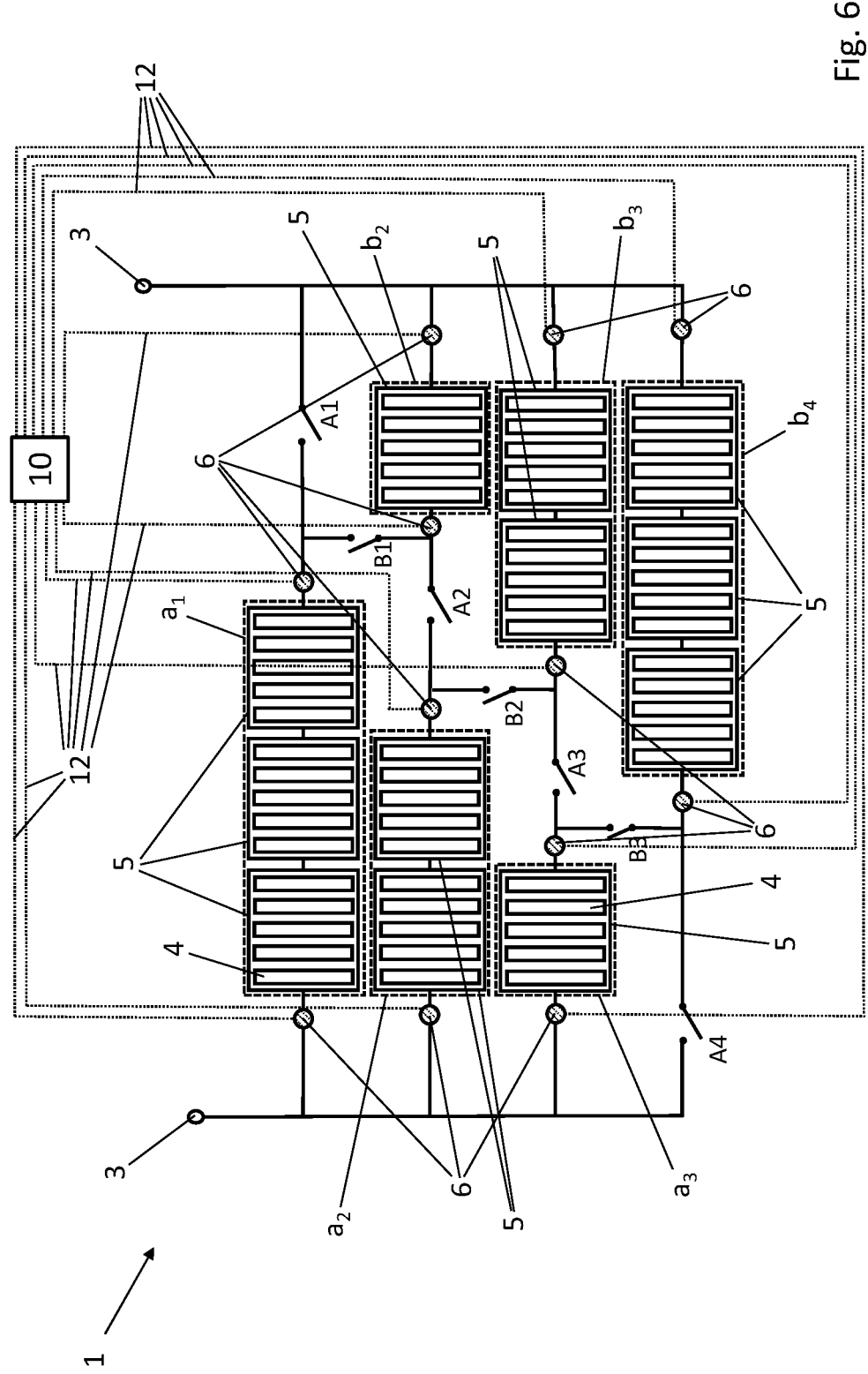
FIG. 6 shows the schematic battery system according to FIG. 1 with a plurality of measuring points.

FIG. 6 shows the schematic battery system 1 according to FIG. 1 with a plurality of measuring points 6. A measuring point 6 is arranged in each case on both sides of a group $a_1$ . . . $a_3$, $b_2$ . . . $b_4$. The two measuring points 6 which are allocated to one group $a_1$ . . . $a_3$, $b_2$ . . . $b_4$ are designed and set up to collectively measure a voltage which is actually applied to the respective group $a_1$ . . . $a_3$, $b_2$ . . . $b_4$ and/or the groups $a_1$ . . . $a_3$, $b_2$ . . . $b_4$ which are in each case connected in series to one another. The measuring points 6 are in each case connected to the control system 10 by means of a signal connection 12 to transmit corresponding measurement signals to the control system 10. In this embodiment, the switches A1 . . . A4, B1 . . . B3 are also opened or closed by the control system 10, wherein each switch A1 . . . A4, B1 . . . B3 is connected to the control system 10 by a signal connection 11. For better clarity, these signal connections 11 are not explicitly illustrated.

FIGS. 7A-7D show possible changes of the ratio between the number of battery cell packs 5 in the first group $a_n$ and the number of battery cell packs 5 in the second group $b_n$. In the embodiments shown, six layers m=6 are shown in each case. The number of battery cell packs is indicated schematically by the size of the rectangle. In addition, a dashed line is marked in each case to illustrate more effectively the change of the ratio.

In FIG. 7A, the change of the ratio has a linear course with a constant slope. In the example represented, the groups are divided symmetrically. With this arrangement and the corresponding switching architecture, different voltage levels are achieved with voltage source redundancy, but also the battery voltages themselves are stabilized.

The change of the ratio also has a linear course with a constant slope in FIG. 7B. However, the slope is smaller than in the case of the change of the ratio shown in FIG. 7A and is "centrally" displaced. This arrangement and corresponding switching architecture guarantees a stable battery voltage.

Figure 7D:
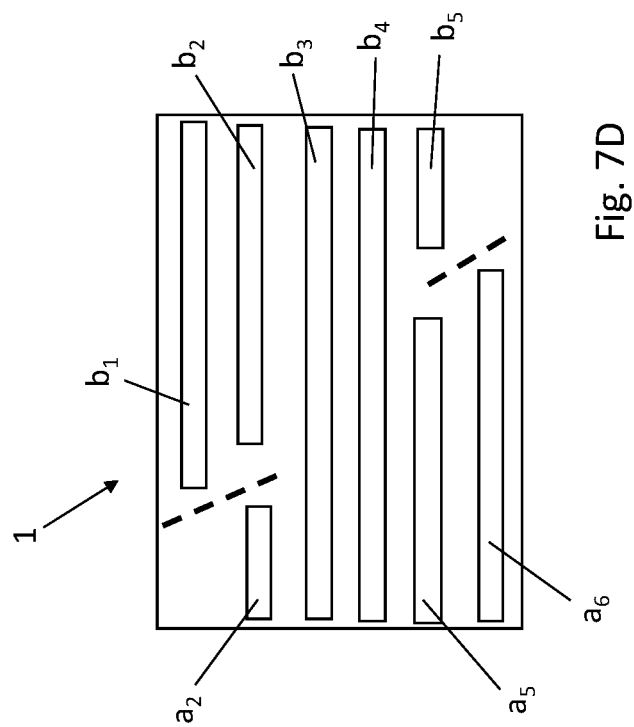
Figure 7C:
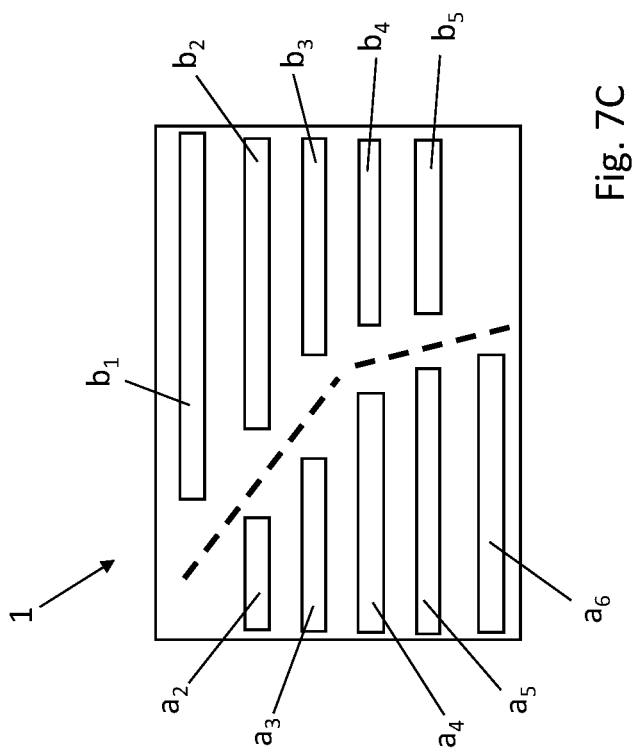

In FIG. 7C, the change of the ratio has a piecewise linear course with two different slopes. The course of the change of the ratio is therefore divided into two sections. The slope in the upper section is larger and arranged "off-center" in comparison to the slope in the lower section. This arrangement and corresponding switching architecture provides battery capacity redundancies for a plurality of vehicle voltages which produce a non-linear distribution of the level of voltage sources.

In FIG. 7D, the change of the ratio has an interrupted linear course. This arrangement and corresponding switching architecture provides battery capacity redundancies for a plurality of vehicle voltages which produce a non-linear distribution of the battery capacities.

While representative embodiments are described above, it is not intended that these embodiments describe all possible forms of the claimed subject matter. The words used in the specification are words of description rather than limitation, and it is understood that various changes may be made without departing from the disclosure and claimed subject matter. Additionally, the features of various implementing embodiments may be combined to form further embodiments not explicitly described or illustrated, but within the scope of the disclosure and claimed subject matter and recognizable to one of ordinary skill in the art. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A battery system comprising:
   a plurality of battery cell packs each having a first plurality of battery cells, the battery cell packs arranged in a first plurality of layers connectable to output connections of the battery system;
   a plurality of first switches each selectively connecting a battery cell pack to either another battery cell pack within a layer, or to an output connection of the battery system;
   a plurality of second switches each selectively connecting two of the layers; and
   a control system coupled to the first switches and the second switches, wherein the control system controls the first switches and the second switches to selectively connect one or more of the plurality of battery cell packs in parallel and one or more of the battery cell packs in series based on a desired voltage and desired current provided to the outputs of the battery system, wherein the battery cell packs of an outer layer of the plurality of layers are combined in one of a first group and a second group, and the battery cell packs of an inner layer of the plurality of layers are in each case divided into a first inner group and a second inner group, wherein each layer includes the same number of battery cell packs.

2. The battery system of claim 1 wherein each of the second switches is arranged between groups of two adjacent layers such that in each case a first group of a first layer is selectively connected in series to a second group in a second layer by an associated second switch, and each of the first switches is arranged between groups of an inner layer such that a first inner group of an inner layer is selectively connected in series to a second group of the inner layer.

3. The battery system of claim 2 wherein the number of the battery cell packs in the first group of a layer is different for each of the layers.

4. The battery system of claim 3 wherein the outputs of the battery system comprise at least three outputs with at least one of the outputs connected between two battery cell packs of a single layer.

5. The battery system of claim 4 wherein the control system is configured to measure voltage across each group of battery cell packs.

6. The battery system of claim 5 wherein at least one of the layers includes only one group of battery cell packs.

7. The battery system of claim 6 wherein each group of battery cell packs includes a plurality of battery cell packs, each of the plurality of battery cell packs permanently connected in series to at least one other battery cell pack.

8. A battery system comprising:
   a first layer of at least three battery cell packs each including at least two battery cells, the battery cell packs of the first layer arranged with at least two of the at least three battery cell packs permanently connected in series and selectively connected in series by a first switch to either at least one battery cell pack of the at least three battery cell packs or a battery system output;
   a second layer of at least three battery cell packs each including at least two battery cells, the battery cell packs of the second layer arranged with at least two of the at least three battery cell packs permanently connected in series and selectively connected in series by a second switch to either at least one battery cell pack of the at least three battery cell packs of the second layer or a battery system output;
   a third switch selectively connecting the first layer and the second layer; and
   a controller configured to control the first switch, the second switch, and the third switch.

9. The battery system of claim 8 wherein the first layer and the second layer include an equal number of battery cell packs.

10. The battery system of claim 8 wherein the first layer battery cell packs are all permanently connected in series and selectively connected by the first switch to the battery system output.

11. The battery system of claim 8 further comprising at least three battery system outputs, wherein at least one of the at least three battery system outputs is connected between the battery cell packs of the second layer and the second switch.

12. The battery system of claim 8 further comprising a switch selectively connecting each layer, the switch in communication with the controller.

13. The battery system of claim 8 further comprising:
    a third layer of at least three battery cell packs each including at least two battery cells; and
    a fourth switch in communication with the controller and selectively connecting one of the third layer battery cell packs to one of either the battery system output, or another of the third layer battery cell packs.

14. The battery system of claim 13 wherein the third layer battery cell packs are all permanently connected in series and selectively connected by the fourth switch to the battery system output.

15. The battery system of claim 13 further comprising a fifth switch in communication with the controller and selectively connecting the third layer to the second layer.

16. The battery system of claim 15 wherein the fifth switch is connected between two of the third layer battery cell packs, and wherein at least two of the third layer battery cell packs are permanently connected in series.

17. A battery system comprising:
    a first outer layer of at least three battery cell packs each including at least two battery cells, the at least three battery cell packs of the first outer layer permanently connected in series relative to one another and selectively connected by a first switch to one of a plurality of battery system outputs;
    a second outer layer of at least three battery cell packs each including at least two battery cells, the at least three battery cell packs of the second outer layer permanently connected in series relative to one another and selectively connected by a second switch to one of the plurality of battery system outputs;
    at least one inner layer of at least three battery cell packs each including at least two battery cells, at least two of the at least three battery cell packs permanently connected in series and selectively connected in series by a third switch to at least one of the at least three battery cell packs;
    a fourth switch selectively connecting the first outer layer to the at least one inner layer;
    a fifth switch selectively connecting the at least one inner layer to the second outer layer; and
    a controller configured to control the first, second, third, fourth, and fifth switches.

18. The battery system of claim 17 wherein the first switch selectively connects the first outer layer to a first one of the plurality of battery system outputs, and the second switch selectively connects the second outer layer to a second one of the plurality of battery system outputs.

19. The battery system of claim 18 wherein the plurality of battery system outputs includes a third battery system output connected between at least two of the battery call packs of the at least one inner layer.

* * * * *